(12) United States Patent
Endel et al.

(10) Patent No.: US 10,313,767 B2
(45) Date of Patent: Jun. 4, 2019

(54) FUEL SUBMETERING USING FIRING RATE SIGNALS

(71) Applicant: Honeywell International Inc., Morris Plains, NJ (US)

(72) Inventors: Petr Endel, Prague (CZ); Ondrej Holub, Prague (CZ); Karel Marik, Revnice (CZ)

(73) Assignee: Honeywell International Inc., Morris Plains, NJ (US)

( * ) Notice: Subject to any disclaimer, the term of this patent is extended or adjusted under 35 U.S.C. 154(b) by 493 days.

(21) Appl. No.: 15/093,498

(22) Filed: Apr. 7, 2016

(65) Prior Publication Data

US 2017/0295416 A1    Oct. 12, 2017

(51) Int. Cl.
| | |
|---|---|
| *H04Q 9/14* | (2006.01) |
| *G05B 19/416* | (2006.01) |
| *F23N 5/18* | (2006.01) |
| *G01F 13/00* | (2006.01) |
| *F23N 1/00* | (2006.01) |

(52) U.S. Cl.
CPC ............... *H04Q 9/14* (2013.01); *F23N 1/002* (2013.01); *F23N 5/184* (2013.01); *G01F 13/006* (2013.01); *G05B 19/416* (2013.01); *F23N 2023/42* (2013.01); *F23N 2027/20* (2013.01); *F23N 2037/02* (2013.01); *G05B 2219/37371* (2013.01)

(58) Field of Classification Search
CPC .......... F23N 5/184; H04Q 9/14; G01F 13/006
USPC ........................................................ 700/282
See application file for complete search history.

(56) References Cited

U.S. PATENT DOCUMENTS

| | | | |
|---|---|---|---|
| 4,530,247 A | 7/1985 | Haas | |
| 4,645,450 A | 2/1987 | West | |
| 4,864,972 A * | 9/1989 | Batey | ............. F22B 35/008 |
| | | | 122/448.3 |
| 5,709,420 A | 1/1998 | Umino | |
| 6,247,919 B1 | 6/2001 | Welz, Jr. et al. | |
| 8,126,631 B2 | 2/2012 | Scalia, Jr. | |
| 9,028,245 B2 | 5/2015 | Fan et al. | |
| 2008/0046388 A1 | 2/2008 | Budike, Jr. | |
| 2009/0142717 A1 | 6/2009 | Lavelle | |
| 2010/0112500 A1 | 5/2010 | Maiello et al. | |
| 2015/0045971 A1 * | 2/2015 | Endel | ............. G05D 7/0629 |
| | | | 700/282 |
| 2015/0160099 A1 * | 6/2015 | Hamouz | ............. G01K 17/06 |
| | | | 702/45 |

FOREIGN PATENT DOCUMENTS

| | | |
|---|---|---|
| EP | 2778821 A2 | 9/2014 |
| WO | 2011045776 A1 | 4/2011 |

OTHER PUBLICATIONS

The Extended European Search Report for EP Application No. 17163674.9, dated Aug. 30, 2017.

* cited by examiner

*Primary Examiner* — Robert A Cassity (57) ABSTRACT

A fuel sub-metering mechanism for appliances that consume fuel. Each appliance may have a firing rate indicator. An individual fuel line may be connected to each appliance. A main fuel line may be connected to individual fuel lines. A meter may be connected to the main fuel line. A processor may be connected to the firing rate indicators and to the meter. The meter may measure total fuel consumption by the appliances. The processor may provide a sub-meter estimate of fuel consumed by each appliance. The sub-meter estimate may be based at least in part on a firing rate of the respective appliance and the total fuel consumption as indicated by the meter.

17 Claims, 7 Drawing Sheets

FUEL SUBMETERING USING FIRING RATE SIGNALS

BACKGROUND

The present disclosure pertains to appliances and particularly to appliances utilizing fuel.

SUMMARY

The disclosure reveals a fuel sub-metering mechanism for appliances that consume fuel. Each appliance may have a firing rate indicator. An individual fuel line may be connected to each appliance. A main fuel line may be connected to individual fuel lines. A meter may be connected to the main fuel line. A processor may be connected to the firing rate indicators and to the meter. The meter may measure total fuel consumption by the appliances. The processor may provide a sub-meter estimate of fuel consumed by each appliance. The sub-meter estimate may be based at least in part on a firing rate of the respective appliance and the total fuel consumption as indicated by the meter.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

In building heating, ventilation and air conditioning (HVAC) and production domains, hot water or steam production may form a significant amount of energy consumption. In many cases, it may be useful to meter fuel consumption of combustion appliances individually (i.e., appliance-by-appliance) to be able to quickly ascertain fuel consumption for various purposes, e.g., monitoring of production process, building maintenance, or division between business units. Another need to measure fuel consumption individually may be due to requirements of legislation, e.g., the Environmental Protection Agency (EPA) Boiler Maximum Achievable Control Technology (MACT) new requirement to report fuel burned by an appliance for emission documentation.

Several techniques for measuring fuel consumption may exist in industry today. Mass or volume flow meters may be the most popular. These meters may be very expensive in terms of parts and labor to install. Thus, an issue to overcome may be how to get a fuel meter installed in front of every burner in a large facility without adding large costs.

Often, a building or set of production lines may have a main fuel meter for all appliances for billing purposes, and each appliance may have a firing rate signal (i.e., a signal that commands the amount of fuel in a burner).

The present approach may provide a way to derive fuel consumption "$GC_I$" of individual appliances using measured total fuel consumption "$GC_T$" and logged firing rates "$FR_I$" of the individual appliances.

The present system and approach may be based on the following observations. 1) Consumption of individual appliances may depend mainly on the respective firing rate signal. 2) Without a significant loss of accuracy, the dependency may be approximated with a function (e.g. linear). 3) A ratio between fuel consumption and firing rate of an appliance (i.e., a slope of the linear function) may vary between installations of the same appliance type.

The present system and approach may incorporate the following steps. 1) Select input variables and a model type (such as a model which estimates total fuel consumption as a linear function of firing rate signals). 2) Initialize model parameters (such as estimating a relationship between fuel consumption and firing rates). 3) Update model parameters based on data (using an appropriate type of curve fitting method).

In a simple case, a linear model may be used, but nonlinear models may be used as well. For example, a local nonparametric model may be suitable to capture the shape of the dependency more accurately. Potentially other variables influencing fuel consumption may be used as additional input variables to the model (e.g., excess air ratio, in case of gas used as fuel gas pressure, gas temperature, or other relevant variables).

Model parameters may be initialized, e.g., using datasheet values. If there is no prior information available, it may be possible to start from arbitrary values (for example zeros). In a linear case, the only cost for doing so may involve a longer initial time to converge to actual parameter values.

In a sequel, an approach may disaggregate total fuel consumption. Its requirements on availability and quality of data may be realistic.

A computationally inexpensive version of the approach (linear model) may be reasonably accurate on real data. The version may reveal different consumptions of same type appliances, which appears difficult to explain with an appliances' settings investigation.

The present system and approach may be used at the supervisory level, where it can run offline or in batches on collected data, and at a controller level, where it can run online. At the controller level, simple communication between appliances' controllers may need to be implemented, to collect information about total fuel consumption and the appliances' firing rates.

The information about fuel consumption may be used (in an HVAC domain) for subsequent fault detection and diagnosis algorithms, for example, a detection of increased consumption (decreased efficiency) of a given appliance, optimization algorithms, for example, building supervisory controller, or the analytics, for example, circulating water mass flow estimate (a physical sensor of water mass flow may be expensive to install and be very rare).

Figure 1:
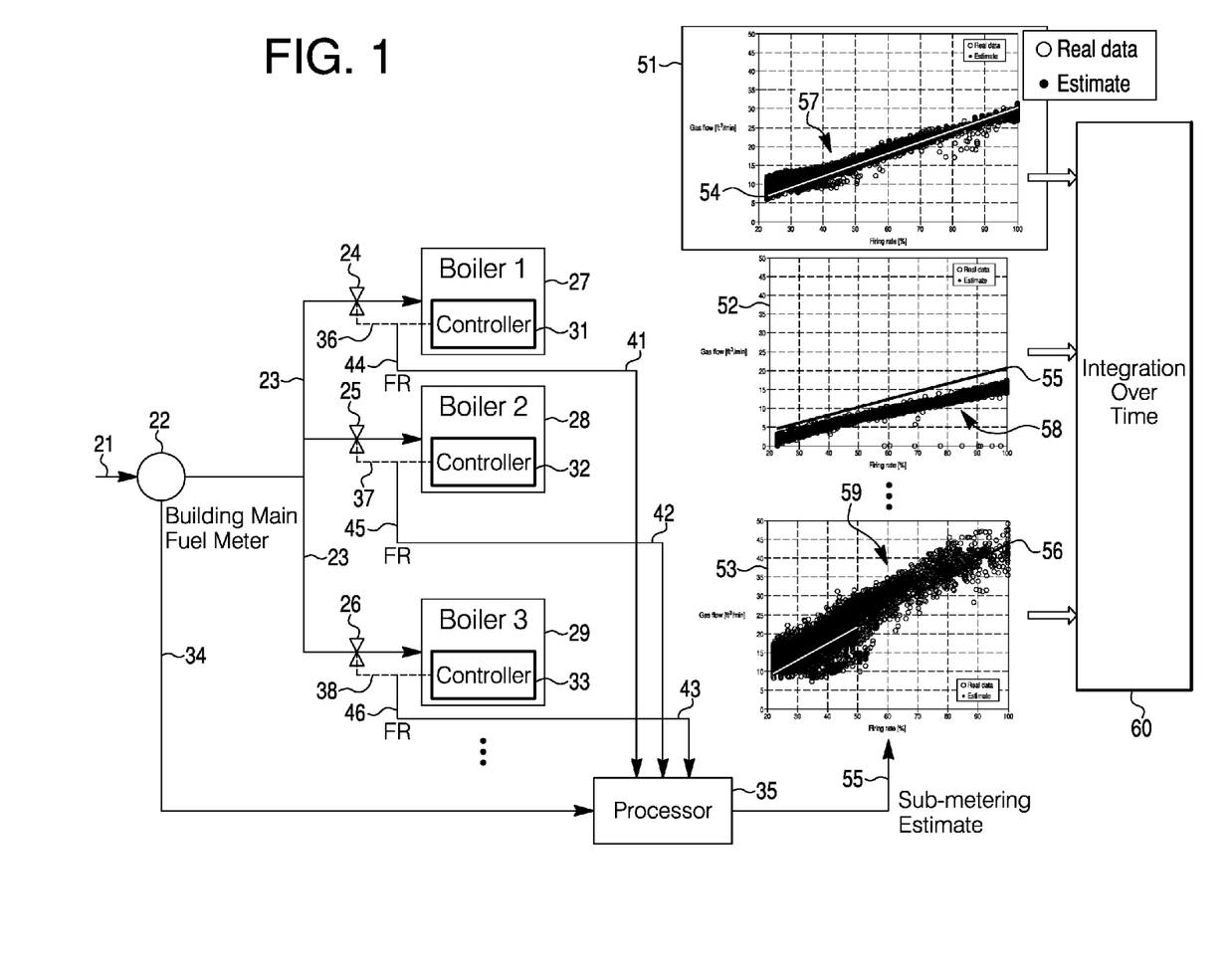
FIG. 1 is an apparatus diagram of the present system and approach.

FIG. 1 is a diagram of the present system and approach applied to the system with, for example, gas as a fuel, and an illustrative example appliances such as boilers. The present system and approach may be applicable to virtually all appliances consuming fuel (and having firing rate signal) besides boilers. A gas supply may be connected via a fuel line 21 to a main fuel meter 22 for an installation such as a building. From fuel meter 22, gas may flow via fuel lines 23 to boilers 27, 28 and 29, respectively. There may be more or less than three boilers. Boilers 27, 28 and 29 may have controllers 31, 32 and 33 that control an amount of fuel (e.g., gas) burnt (depicted by valves 24, 25 and 26, respectively, on schematics, but can be done in another way) via firing rate signals 36, 37 and 38. Examples how to control an amount of fuel may be various, such as valve opening, fan speed and venturi tube.

Main fuel meter 22 may send a signal indicating total amount of gas being provided to the boilers, on a line 34 to a processor 35. Processor 35 may be an estimator that receives signals indicating firing rate signals 36, 37 and 38 for boilers 27, 28 and 29, respectively. Boilers 27, 28 and 28 may alternatively be referred to as boilers 1, 2 and 3. There may be more or less than three boilers in other but similar arrangements. A processor may be one or more items being part or a whole of a boiler controller, software located in a building automation system, a cloud based solution, an intelligent valve with a data processing functionality, or other related equipment.

Figure 2:
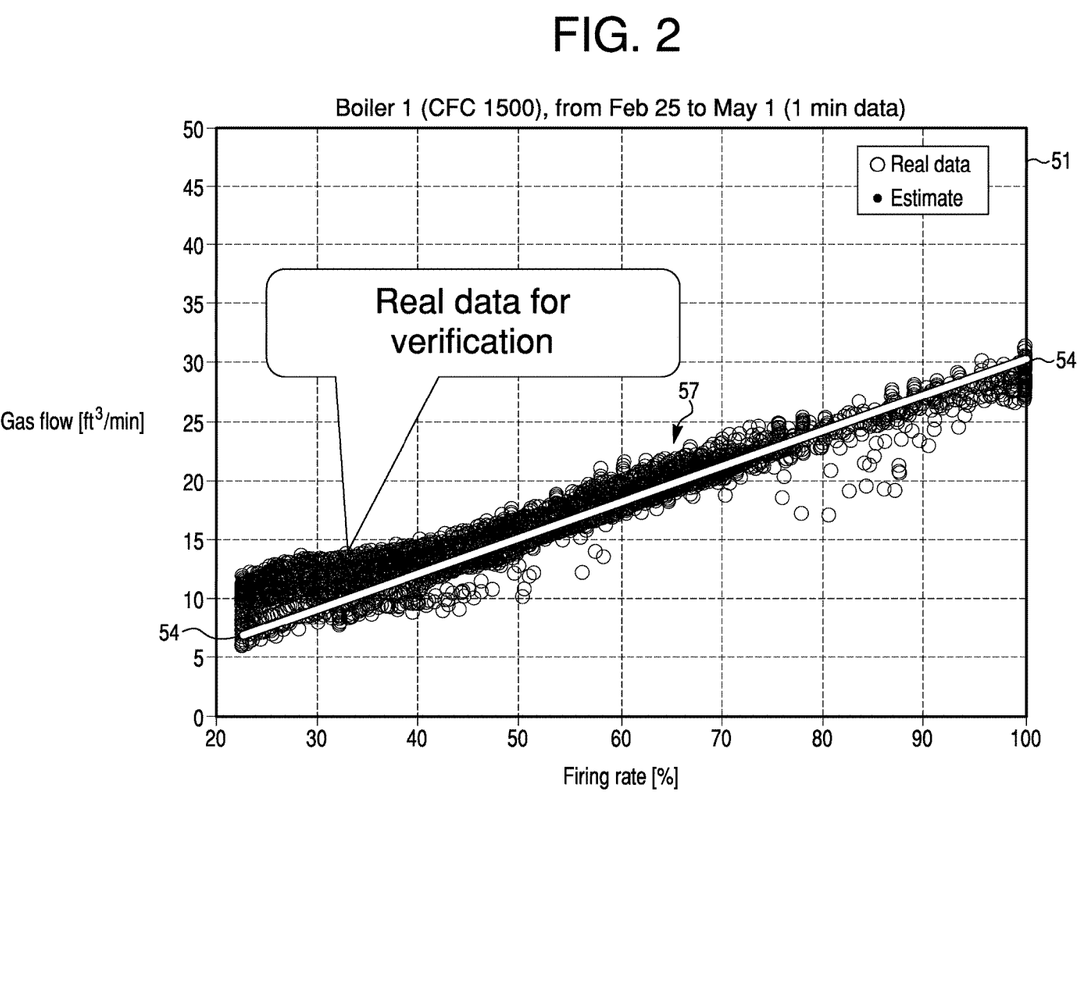
FIGS. 2, 3 and 4 are diagrams of graphs of sub-metering estimates applied to fuel burning for several appliances such as boilers, respectively.
Figure 3:
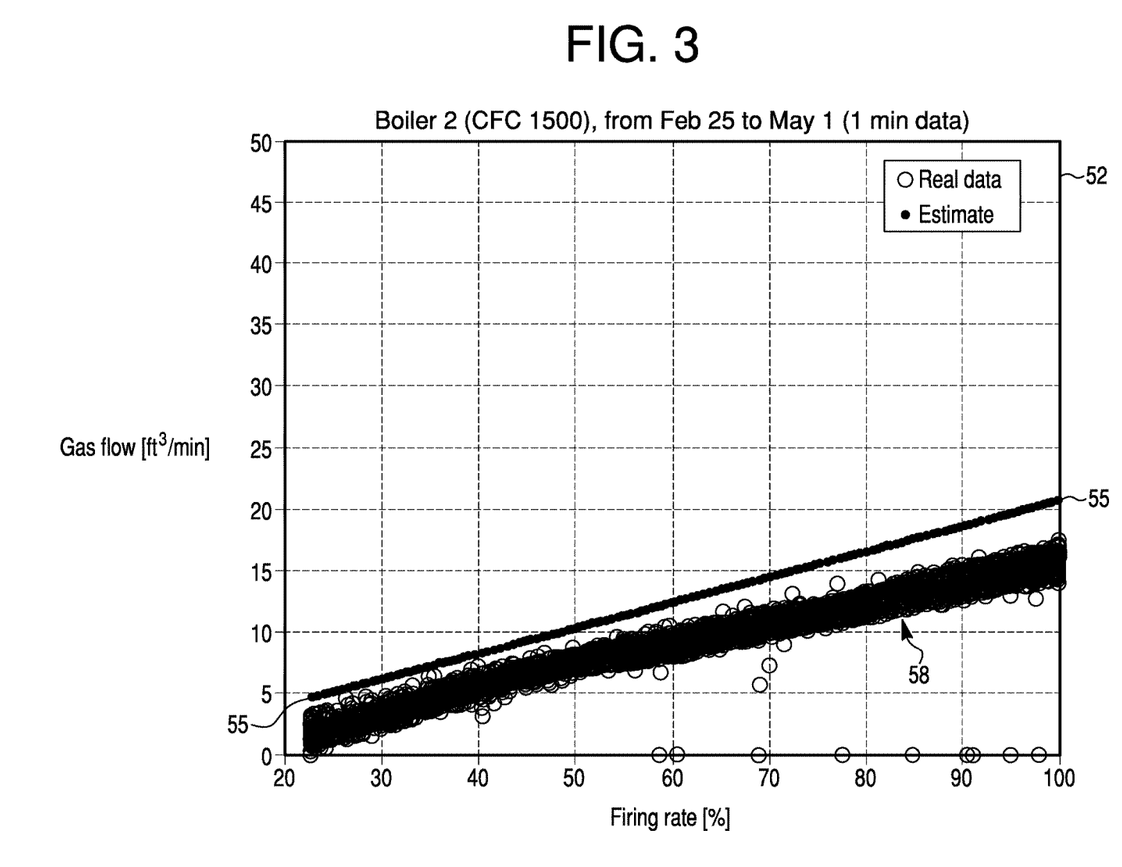
Figure 4:
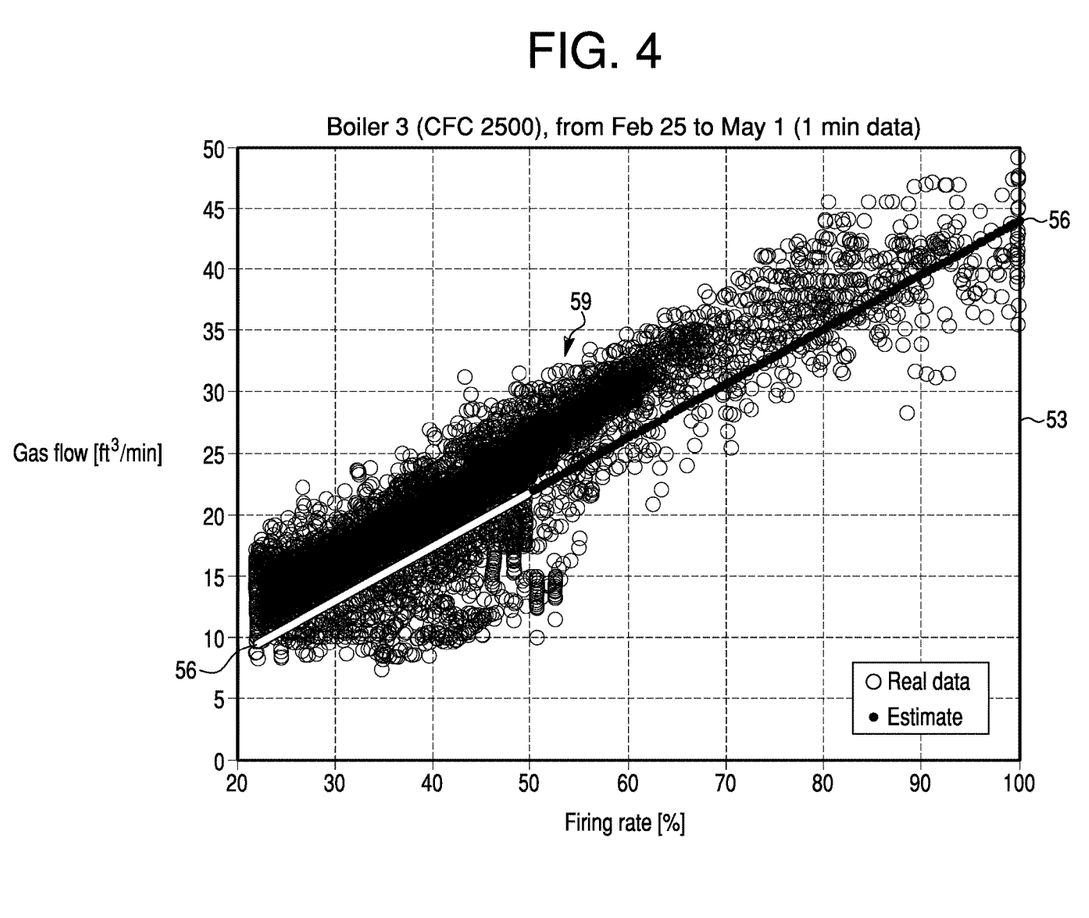

Processor 35 may output on line 55 derived sub-metering estimates of gas consumption for the individual boilers 27, 28 and 29, based on total measured gas consumption of the boilers together and logged firing rates of the individual boilers. The sub-metering estimates may be revealed in graphs 51, 52 and 53, for the boilers, respectively, as lines 54, 55 and 56, as shown in FIG. 1. Enlargements of graphs 51, 52 and 53 are shown in FIG. 2, FIG. 3 and FIG. 4, respectively. For example, real gas consumption data 57, 58 and 59 of individual boilers 27, 28 and 29, may be superimposed as small circles on graphs 51, 52 and 53, respectively, to reveal correlation and verification of sub-metering estimates as indicated by lines 54, 55 and 56 in the graphs. Each graph may represent its information in terms of gas flow in cubic feet per minute versus firing rate in percentage. The graph data may be integrated over time as indicated at item 60 of FIG. 1.

Figure 5:
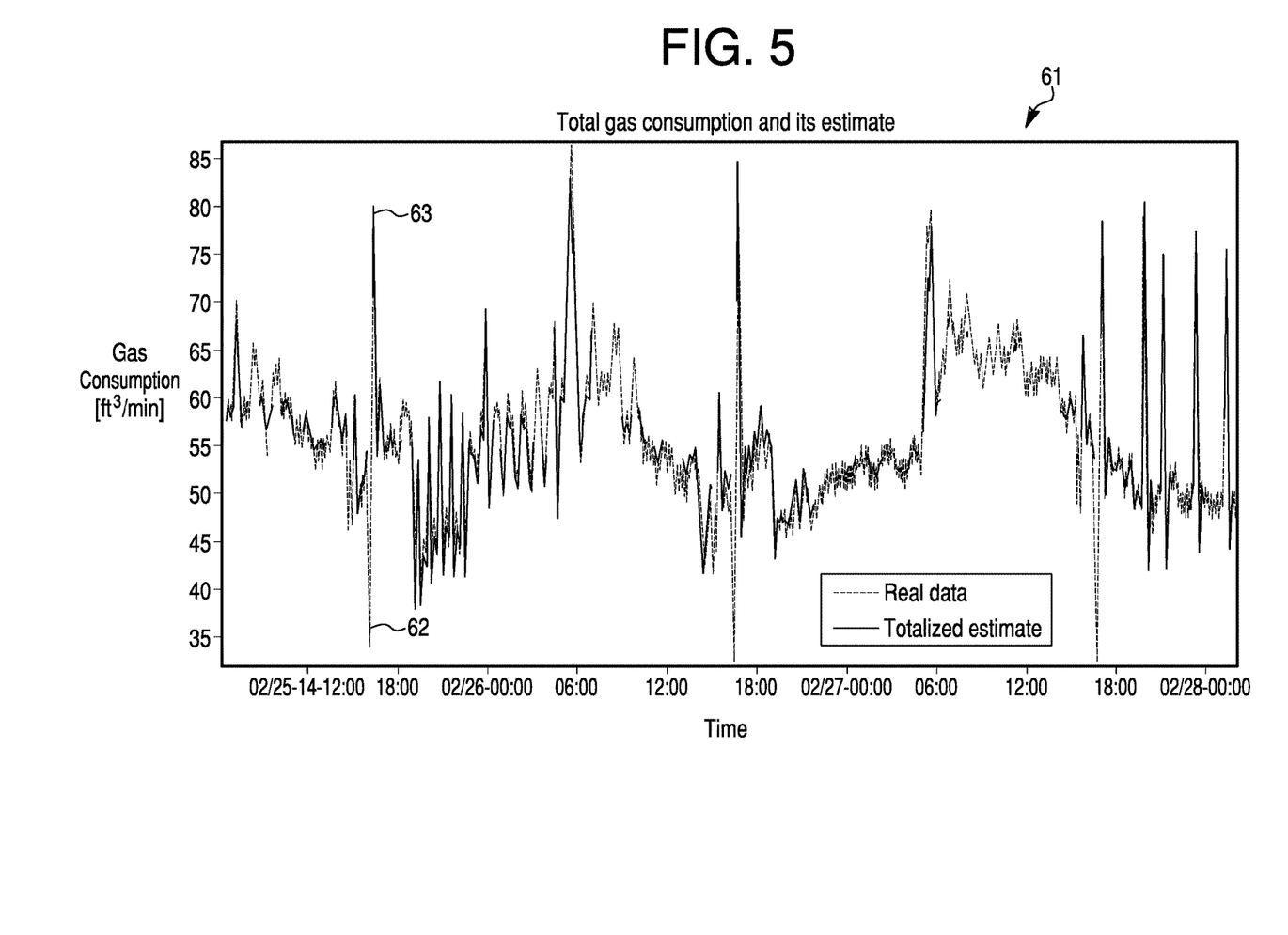
FIG. 5 is a diagram of a graph revealing totalized fuel consumption and its estimate.

FIG. 5 is a diagram of a graph 61 revealing over time gas consumption and its estimate. Dashed curve 62 represents real data. Solid curve 63 represents a totalized estimate. The data may be from three boilers. The real data may be a sum of consumptions of the three boilers (i.e., totalized consumption). The estimate may be a sum of the submetered consumptions of the submetering models (here without normalization).

Figure 6:
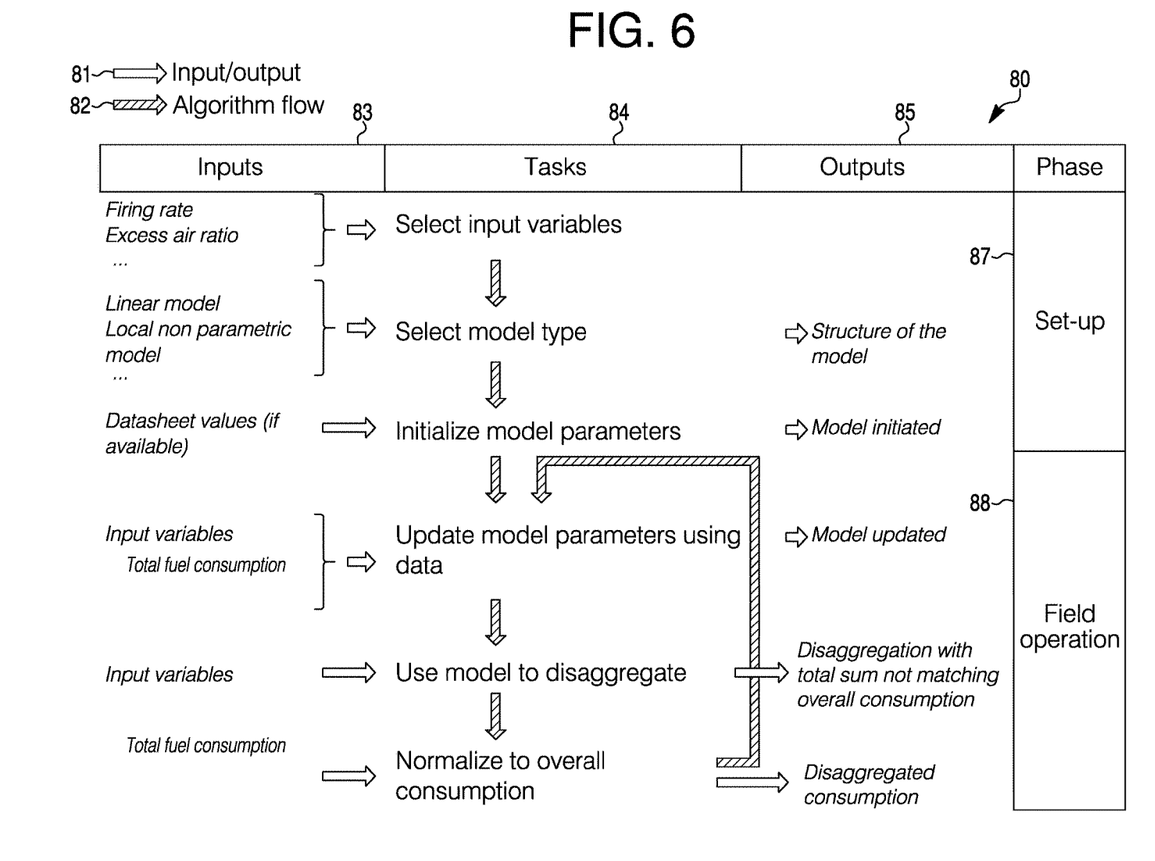
FIG. 6 is a flow diagram of the present system and approach.

FIG. 6 is a flow diagram 80 of the present system and approach. Known inputs may incorporate total fuel consumption of the boilers in the building over time, and firing rates of the boilers in time. Computed outputs may be fuel consumption for the separate boilers (i.e., boiler submetering). A white arrow 81 may indicate inputs and outputs. A hashed arrow 82 may indicate an algorithm flow. Columns 83, 84 and 85 may represent inputs, tasks and outputs. Rows may be classified in a set-up phase 87 and a field operation phase 88.

Setup phase 87 may be a collection of tasks having inputs and outputs. Inputs of firing rate, excess air ratio and so forth, may go to a task of selecting input variables. Inputs of a linear model, local non-parametric model and so forth may go to a task of selecting a model type that has an output of a structure of a model. Inputs of datasheet values (if available) may go to a task of initializing model parameters which has an output of a model initiated.

Field operation phase 88 may be a collection of tasks having inputs and outputs. Input variables may consist of total fuel consumption that go to a task of updating model parameters using data, that outputs a model updated. Input variables incorporating total fuel consumption may go to a task of using a model to disaggregate, that outputs disaggregation with a total sum not matching overall consumption. Input variables incorporating total fuel consumption may go to a task of normalizing overall consumption that outputs disaggregated consumption. From the task to normalize overall consumption, a return may be made to update model parameters using data.

Figure 7:
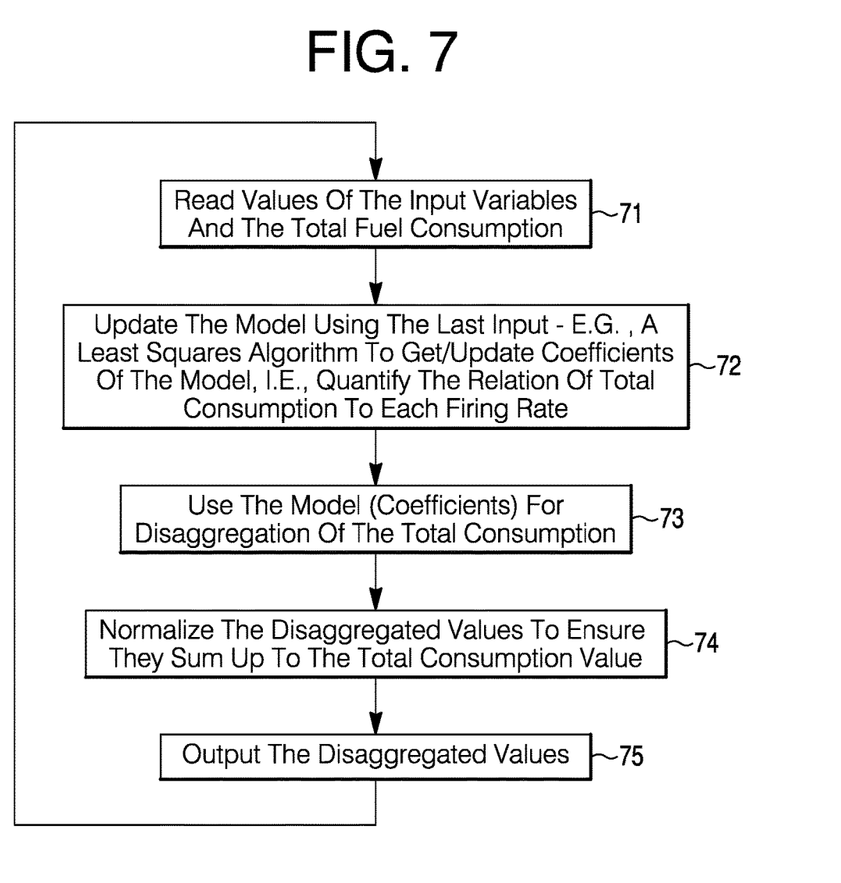
FIG. 7 is a flow diagram of a field operation.

FIG. 7 is a diagram of a field operation. FIG. 7 may be a subset of FIG. 6. Values of the input variables and total fuel consumption may be read at symbol 71. A model may be updated using the last input values with, for example, a least squares algorithm to get/update coefficients of the model, i.e., quantify the relation of each firing rate to total consumption at symbol 72. The model (coefficients) may be used for disaggregation of the total consumption at symbol 73. Disaggregated values may be normalized at symbol 74 to ensure that they sum up to the total consumption value. The disaggregated values may be outputted at symbol 75.

To recap, a system for sub-metering fuel consumption of appliances, may incorporate two or more appliances that can consume fuel, two or more individual fuel lines connected individually to each of the two or more appliances, respectively, a main fuel line having an output connected to the individual fuel lines, a fuel meter connected in series with the main fuel line, and a processor connected to the two or more appliances. Each appliance may have a controller that controls an amount of fuel in an individual fuel line connected to an appliance via a firing rate signal. The controller may provide to the processor a series of firing rate signals each of which individually commands an amount of fuel to the appliance by controlling the amount of fuel in the individual fuel line connected to the appliance via the firing rate signal. The fuel meter may provide signals indicating total fuel consumption by the plurality of appliances. The processor may provide an estimate of an amount of fuel consumed by each appliance derived from the series of firing rate signals from the controller of each appliance of the two or more appliances and signals from the fuel meter indicating total fuel consumption by the two or more appliances.

The system may further incorporate a logging device that records the estimates over time of an amount of fuel consumed by each appliance.

The system may further incorporate a diagnostics instrument that detects one or more anomalies of the estimates over time of an amount of fuel consumed by each appliance and indicates a need for investigation of a cause of the one or more anomalies.

The logging device that records the estimates over time of an amount of fuel consumed by each appliance may enable one or more items of a group incorporating consumption accounting for business units, production progress reports, emission documentation, degradation monitoring of one or more appliances, appliance fault detection, optimization of appliance operation, appliance maintenance, water heating, steam production, and circulation water mass flow estimates.

Communication between controllers of appliances and the processor, and communication between the fuel meter and the processor may result in information about total fuel consumption and firing rates of the appliances for the processor.

An approach for determining disaggregated consumption, may incorporate connecting individual lines respectively to a plurality of appliances, each appliance of the plurality of appliances having a firing rate indicator, connecting a main fuel line to the individual fuel lines, connecting a meter to the main fuel line, and connecting a processor to the meter and to the firing rate indicator of each appliance of the plurality of appliances. The meter may provide a measurement signal to the processor indicating total fuel consumption by the plurality of appliances. The firing rate indicator of each appliance of the plurality of appliances may provide a firing rate signal to the processor.

A firing signal may command an amount of fuel in a connecting individual line. The processor may provide a sub-metering estimate of fuel consumed by each appliance.

The sub-metering estimate of fuel consumed by each appliance by the processor may have an approach incorporating selecting one or more input variables, selecting a model type to determine a structure of a model, initializing parameters of the model with data, updating the parameters of the model with input variables and the total fuel consumption data, using updated parameters of the model and input variables data to disaggregate total fuel consumption, and normalizing the disaggregation having a total sum of disaggregated consumptions equal to overall fuel consumption to obtain a disaggregated consumption in a sub-metering estimate of fuel consumed by each appliance.

The one or more input variables may be selected from a group incorporating a firing rate of an appliance, an excess air ratio of an appliance, and a fuel pressure and a fuel temperature.

The model type may be selected from a group incorporating linear models and local non-parametric models.

The data for initializing parameters of the model may be values obtained from available datasheets of the appliances, from another installation, or from an engineering estimate.

Data for updating the parameters of the model may be values of input variables and total fuel consumption.

A fuel sub-metering mechanism may incorporate two or more appliances, a firing rate indicator at each appliance of the two or more appliances, an individual fuel line connected to each appliance, a main fuel line connected to individual fuel lines, a meter connected to the main fuel line, and a processor connected to the firing rate indicators and to the meter.

The meter may measure total fuel consumption by the two or more appliances. The processor may provide a sub-meter estimate of fuel consumed by each appliance. The sub-meter estimate may be based at least in part on a firing rate of the respective appliance and the total fuel consumption as indicated by the meter.

An output from a firing rate indicator may provide an individual firing rate.

The firing rate may be a signal that commands an amount of fuel in an appliance.

The estimate of fuel consumption for each appliance of the two or more appliances may be derived from a firing rate of the two or more appliances, and a measurement of the overall fuel supply through the main line to the two or more appliances.

The processor may contain an estimator that can be programmed with a selection of a model type and input variables.

A model may depend on the selection of the model type. Model parameters may be initialized with an estimate of dependency between fuel consumption and firing rates. Model parameters may be updated based on input variables data and total fuel consumption data.

A model with updated parameters may be used to disaggregate the total fuel consumption based on input variables data. Disaggregated fuel consumptions may be normalized so that the sum of the disaggregated fuel consumptions equals the total fuel consumption.

U.S. patent application Ser. No. 14/521,154, filed Oct. 22, 2014, and entitled "Valve Controller Configured to Estimate Fuel Consumption, is hereby incorporated by reference. U.S. patent application Ser. No. 12/171,158, filed Jul. 10, 2008, and entitled "Burner firing Rate Determination for Modulating Furnace", is hereby incorporated by reference. U.S. Pat. No. 4,716,858, issued Jan. 5, 1988, and entitled "Automatic Firing Rate Control Mode Means for a Boiler", is hereby incorporated by reference.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A system for sub-metering fuel consumption by appliances, comprising:

two or more appliances that can consume fuel;

two or more individual fuel lines connected individually to each of the two or more appliances, respectively;

a main fuel line having an output connected to the individual fuel lines;

a fuel meter connected in series with the main fuel line; and a processor connected to the two or more appliances; and wherein:

each appliance has a controller that controls an amount of fuel in an individual fuel line connected to an appliance via a firing rate signal;

the controller provides to the processor a series of firing rate signals each of which individually commands an amount of fuel to the appliance by controlling the amount of fuel in the individual fuel line connected to the appliance via the firing rate signal;

the fuel meter provides signals indicating total fuel consumption by the plurality of appliances; and the processor provides an estimate of an amount of fuel consumed by each appliance derived from the series of firing rate signals from the controller of each appliance of the two or more appliances and signals from the fuel meter indicating total fuel consumption by the two or more appliances using an approach, comprising:

selecting one or more input variables;

selecting a model type to determine a structure of a model;

initializing parameters of the model with data;

updating the parameters of the model with input variables and the total fuel consumption data;

using updated parameters of the model and input variables data to disaggregate total fuel consumption; and normalizing the disaggregation having a total sum of disaggregated consumptions equal to overall fuel consumption to obtain a disaggregated consumption in a sub-metering estimate of fuel consumed by each appliance.

2. The system of claim 1, further comprising a logging device that records the estimates over time of an amount of fuel consumed by each appliance.

3. The system of claim 2, further comprising a diagnostics instrument that detects one or more anomalies of the estimates over time of an amount of fuel consumed by each appliance and indicates a need for investigation of a cause of the one or more anomalies.

4. The system of claim 2, wherein the logging device that records the estimates over time of an amount of fuel consumed by each appliance enables one or more items of a group comprising consumption accounting for business units, production progress reports, emission documentation, degradation monitoring of one or more appliances, appliance fault detection, optimization of appliance operation, appliance maintenance, water heating, steam production, and circulation water mass flow estimates.

5. The system of claim 1, wherein communication between controllers of appliances and the processor, and communication between the fuel meter and the processor results in information about total fuel consumption and firing rates of the appliances for the processor.

6. A method for determining disaggregated consumption, comprising:
connecting individual lines respectively to a plurality of appliances, each appliance of the plurality of appliances having a firing rate indicator;
connecting a main fuel line to the individual fuel lines;
connecting a meter to the main fuel line; and
connecting a processor to the meter and to the firing rate indicator of each appliance of the plurality of appliances; and
wherein:
the meter provides a measurement signal to the processor indicating total fuel consumption by the plurality of appliances; and
the firing rate indicator of each appliance of the plurality of appliances provides a firing rate signal to the processor;
a firing signal commands an amount of fuel in a connecting individual line; and
the processor provides a sub-metering estimate of fuel consumed by each appliance, the sub-metering estimate of fuel consumed by each appliance by the processor incorporates an approach comprising:
selecting one or more input variables;
selecting a model type to determine a structure of a model;
initializing parameters of the model with data;
updating the parameters of the model with input variables and the total fuel consumption data;
using updated parameters of the model and input variables data to disaggregate total fuel consumption; and
normalizing the disaggregation having a total sum of disaggregated consumptions equal to overall fuel consumption to obtain a disaggregated consumption in a sub-metering estimate of fuel consumed by each appliance.

7. The method of claim 6, wherein the one or more input variables are selected from a group comprising a firing rate of an appliance, an excess air ratio of an appliance, and a fuel pressure and a fuel temperature.

8. The method of claim 6, wherein the model type is selected from a group comprising linear models and local non-parametric models.

9. The method of claim 6, wherein the data for initializing parameters of the model are values obtained from available datasheets of the appliances, from another installation, or from an engineering estimate.

10. The method of claim 6, wherein data for updating the parameters of the model are values of input variables and total fuel consumption.

11. A fuel sub-metering mechanism for two or more appliances, each appliance of the two or more appliances having a firing rate indicator and an individual fuel line, each individual fuel line is connected to a main fuel line having a meter configured to provide signals indicating total fuel consumption by the two or more appliances, the mechanism comprising:
a processor connected to the firing rate indicators and to the meter;
a controller at each appliance that is configured to:
control an amount of fuel in the individual fuel line connected to the appliance via a firing rate signal;
provide to the processor a series of firing rate signals that commands the amount of fuel to the appliance by controlling the amount of fuel in the individual fuel line connected to the appliance via the firing rate signal; and
wherein the processor is configured to provide an estimate of an amount of fuel consumed by each of the two or more appliances derived from the series of firing rate signals from and the signals from the meter indicating total fuel consumption by the two or more appliances, the estimate of the amount of fuel consumed by each of the two or more appliances incorporates an approach comprising:
selecting one or more input variables;
selecting a model type to determine a structure of a model;
initializing parameters of the model with data;
updating the parameters of the model with input variables and the total fuel consumption data;
using updated parameters of the model and input variables data to disaggregate total fuel consumption; and
normalizing the disaggregation having a total sum of disaggregated consumptions equal to overall fuel consumption to obtain a disaggregated consumption in a sub-metering estimate of fuel consumed by each appliance.

12. The mechanism of claim 11, wherein an output from the firing rate indicator at each appliance of the two or more appliances provides an individual firing rate.

13. The mechanism of claim 12, wherein the firing rate is a signal that commands an amount of fuel in an appliance.

14. The mechanism of claim 12, wherein the estimate of fuel consumption for each appliance of the two or more appliances is derived from a firing rate of the two or more appliances, and a measurement of the overall fuel supply through the main line to the two or more appliances.

15. The mechanism of claim 11, wherein the processor contains an estimator that can be programmed with a selection of a model type and input variables.

16. The mechanism of claim 15, wherein:
a model depends on the selection of the model type;
model parameters are initialized with an estimate of dependency between fuel consumption and firing rates; and
model parameters are updated based on input variables data and total fuel consumption data.

17. The mechanism of claim 16, wherein:
a model with updated parameters is used to disaggregate the total fuel consumption based on input variables data; and
disaggregated fuel consumptions are normalized so that the sum of the disaggregated fuel consumptions equals the total fuel consumption.

* * * * *